US007025422B2

(12) United States Patent
Fast

(10) Patent No.: US 7,025,422 B2

(45) Date of Patent: Apr. 11, 2006

(54) ROUND RECLINER ASSEMBLY WITH REAR FOLDING LATCH

(75) Inventor: Scott Fast, Macomb Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/798,930

(22) Filed: Mar. 11, 2004

(65) Prior Publication Data

US 2005/0212340 A1 Sep. 29, 2005

(51) Int. Cl.
*B60N 2/02* (2006.01)

(52) U.S. Cl. ................................................ 297/378.14

(58) Field of Classification Search ........... 297/378.12, 297/367, 354.13, 63, 125, 335, 336, 378.14
See application file for complete search history.

(56) References Cited

U.S. PATENT DOCUMENTS

775 A 6/1838 Carver
289,653 A 12/1883 Haynes
2,507,997 A 5/1950 Roedding et al.
2,941,583 A 6/1960 Tischler et al.
3,459,065 A 8/1969 Fender
3,641,838 A 2/1972 Turner
3,663,056 A 5/1972 Turner
3,737,946 A 6/1973 Guiliani
3,879,802 A 4/1975 Werner
3,901,100 A 8/1975 Iida et al.
4,076,309 A 2/1978 Chekirda et al.
4,082,352 A 4/1978 Bales et al.
4,085,969 A 4/1978 Nakane et al.
4,087,885 A 5/1978 Gillentine
4,103,970 A 8/1978 Homier
4,133,578 A 1/1979 Fancy
4,143,905 A 3/1979 Hensel et al.
4,159,815 A 7/1979 Strowik et al.
4,348,050 A 9/1982 Letournoux et al.
4,591,207 A 5/1986 Nithammer et al.
4,709,965 A 12/1987 Kazaoka et al.
4,765,680 A 8/1988 Kawashima
4,767,158 A 8/1988 Satoh
4,770,464 A 9/1988 Pipon et al.
4,875,735 A 10/1989 Moyer et al.
4,884,845 A 12/1989 Schmale et al.
4,946,223 A 8/1990 Croft et al.
4,995,669 A 2/1991 Croft
4,997,223 A 3/1991 Croft
5,150,632 A 9/1992 Hein
5,161,856 A 11/1992 Nishino (Continued)

FOREIGN PATENT DOCUMENTS

FR 2 578 602 9/1986

*Primary Examiner*—Peter M. Cuomo
*Assistant Examiner*—Sarah B. McPartlin
(74) *Attorney, Agent, or Firm*—Harness, Dickey & Pierce, P.L.C.

(57) ABSTRACT

A vehicle seat recliner and folding latch assembly is provided. The assembly generally includes a lower quadrant disk, a slide pin sub-assembly and a recliner arm. The slide pin sub-assembly is supported on the lower quadrant disk for pivotal displacement between a first position and a second position. The recliner arm is supported for pivotal displacement on the slide-pin subassembly. The recliner arm includes an engagement edge engaging the slide pin sub-assembly. The engagement edge is adapted to lock the slide pin sub-assembly in the first and second positions.

22 Claims, 12 Drawing Sheets

U.S. PATENT DOCUMENTS 5,301,569 A 4/1994 Droulon
5,482,349 A * 1/1996 Richter et al. ................ 297/15
5,507,553 A 4/1996 Nishizawa et al.
5,558,402 A 9/1996 Yamada
5,590,931 A 1/1997 Fourrey et al.
5,611,599 A 3/1997 Baloche et al.
5,622,407 A 4/1997 Yamada et al.
5,632,525 A 5/1997 Uramichi
5,664,836 A 9/1997 Takagi
5,664,837 A 9/1997 Takagi
5,664,838 A 9/1997 Baloche
5,678,895 A 10/1997 Matsuura et al.
5,681,086 A 10/1997 Baloche
5,692,589 A 12/1997 Beguin
5,702,156 A 12/1997 Takagi
5,709,133 A 1/1998 Coggon et al.
5,718,483 A 2/1998 Yamaguchi et al.
5,725,452 A 3/1998 Droulon et al.
5,749,624 A 5/1998 Yoshida
5,749,625 A 5/1998 Robinson
5,755,491 A 5/1998 Baloche et al.
5,762,400 A 6/1998 Okazaki et al.
5,769,494 A 6/1998 Barrere et al.
5,779,313 A 7/1998 Rohee
5,785,386 A 7/1998 Yoshida
5,788,325 A 8/1998 Ganot
5,813,724 A 9/1998 Matsuura et al.
5,816,656 A 10/1998 Hoshihara et al.
5,820,218 A 10/1998 Baloche et al.
5,820,219 A 10/1998 Rohee
5,857,746 A 1/1999 Barrere et al.
5,871,414 A 2/1999 Voss et al.
5,873,630 A 2/1999 Yoshida et al.
5,881,854 A 3/1999 Rougnon-Glasson
5,884,972 A 3/1999 Deptolla
5,934,753 A 8/1999 Lange
5,984,413 A 11/1999 Baloche et al.
5,997,090 A 12/1999 Baloche et al.
6,003,945 A 12/1999 Kojima
6,007,152 A 12/1999 Kojima et al.
6,007,153 A 12/1999 Benoit et al.
6,019,430 A 2/2000 Magyar et al.
6,023,994 A 2/2000 Yoshida
6,039,400 A 3/2000 Yoshida et al.
6,082,821 A 7/2000 Baloche et al.
6,085,386 A 7/2000 Blanchard et al.
6,092,874 A 7/2000 Kojima et al.
6,095,608 A 8/2000 Ganot et al.
6,102,480 A 8/2000 Asano
6,112,370 A 9/2000 Blanchard et al.
6,120,098 A 9/2000 Magyar et al.
6,142,569 A 11/2000 Kidokoro et al.
6,149,235 A 11/2000 Fahim
6,161,899 A * 12/2000 Yu ........................ 297/378.12
6,164,723 A 12/2000 Ganot
6,178,596 B1 1/2001 Choi
6,220,666 B1 4/2001 Ohya
6,224,157 B1 5/2001 Di Luccio
6,253,894 B1 7/2001 Schumann et al.
6,283,886 B1 9/2001 Schumann
6,290,297 B1 * 9/2001 Yu ........................ 297/378.12
6,312,053 B1 11/2001 Magyar
6,318,805 B1 11/2001 Asano
6,325,458 B1 12/2001 Rohee et al.
6,328,382 B1 12/2001 Yamashita
6,328,383 B1 12/2001 Rohee et al.
6,332,647 B1 12/2001 Yoshida et al.
6,332,649 B1 12/2001 Vossmann
6,338,532 B1 1/2002 Sugimoto
6,364,413 B1 4/2002 Rohee et al.
6,390,557 B1 5/2002 Asano
6,402,249 B1 6/2002 Rohee et al.
6,439,663 B1 8/2002 Ikegaya
6,454,354 B1 9/2002 Vossmann et al.
6,464,298 B1 10/2002 Hansel et al.
6,464,299 B1 * 10/2002 Castagna ............... 297/378.12
6,474,740 B1 11/2002 Kondo et al.
6,488,338 B1 12/2002 Hoshihara
6,520,583 B1 2/2003 Bonk
6,568,756 B1 * 5/2003 Sugimoto et al. ........... 297/335
6,598,926 B1 * 7/2003 Price et al. .............. 296/65.09
6,669,299 B1 * 12/2003 Carlson et al. ........ 297/378.14
6,746,083 B1 * 6/2004 Drew et al. ............ 297/378.12
2001/0001220 A1 5/2001 Rohee et al.
2002/0000746 A1 1/2002 Matsuura et al.
2002/0017811 A1 2/2002 Cilliere et al.
2002/0024246 A1 2/2002 Yamada et al.
2002/0033627 A1 3/2002 Hoshihara et al.
2002/0041119 A1 4/2002 Kojima et al.
2002/0043852 A1 4/2002 Uramichi
2002/0043855 A1 4/2002 Lange
2002/0043856 A1 4/2002 Ikegaya
2002/0050732 A1 5/2002 Koga et al.
2002/0053825 A1 5/2002 Reubeuze et al.
2002/0070596 A1 6/2002 Nonomiya et al.
2002/0096922 A1 7/2002 Villaroel et al.
2002/0096923 A1 7/2002 Uramichi
2002/0096924 A1 7/2002 Reubeuze
2002/0096925 A1 7/2002 Uramichi
2003/0127898 A1 * 7/2003 Niimi et al. ................ 297/367
2004/0090102 A1 * 5/2004 Tame et al. ............ 297/378.12

* cited by examiner

ROUND RECLINER ASSEMBLY WITH REAR FOLDING LATCH

FIELD OF THE INVENTION

The present invention relates to a vehicle seat latch assembly, and more particularly, to a combination vehicle seat recliner and folding latch assembly.

BACKGROUND OF THE INVENTION

Vehicle markets are extremely competitive, particularly the minivan and sport utility markets. A growing focus of the competition is the overall utility and comfort of these vehicles. One important utility feature that is gaining much attention includes flexible vehicle interiors, and more particularly, flexible front and second row seating assemblies. Flexibility in this sense refers to the ability to modify the configuration of a particular seating assembly. For example, a passenger might desire to fold down a front or second row seat to provide a work space during travel. As such, a passenger could use the rear of the folded down seat as a desk. Additionally, a passenger might desire to configure the seat in a manner providing for an open area in the cargo compartment of the vehicle. As such, a customer could use the cargo compartment to load large items on top of a load floor.

SUMMARY OF THE INVENTION

A vehicle seat recliner and folding latch assembly is provided. The assembly generally includes a lower quadrant disk, a slide pin sub-assembly and a recliner arm. The slide pin sub-assembly is supported on the lower quadrant disk for pivotal displacement between a first position and a second position. The recliner arm is supported for pivotal displacement on the slide-pin subassembly. The recliner arm includes an engagement edge engaging the slide pin sub-assembly. The engagement edge is adapted to lock the slide pin sub-assembly in the first and second positions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
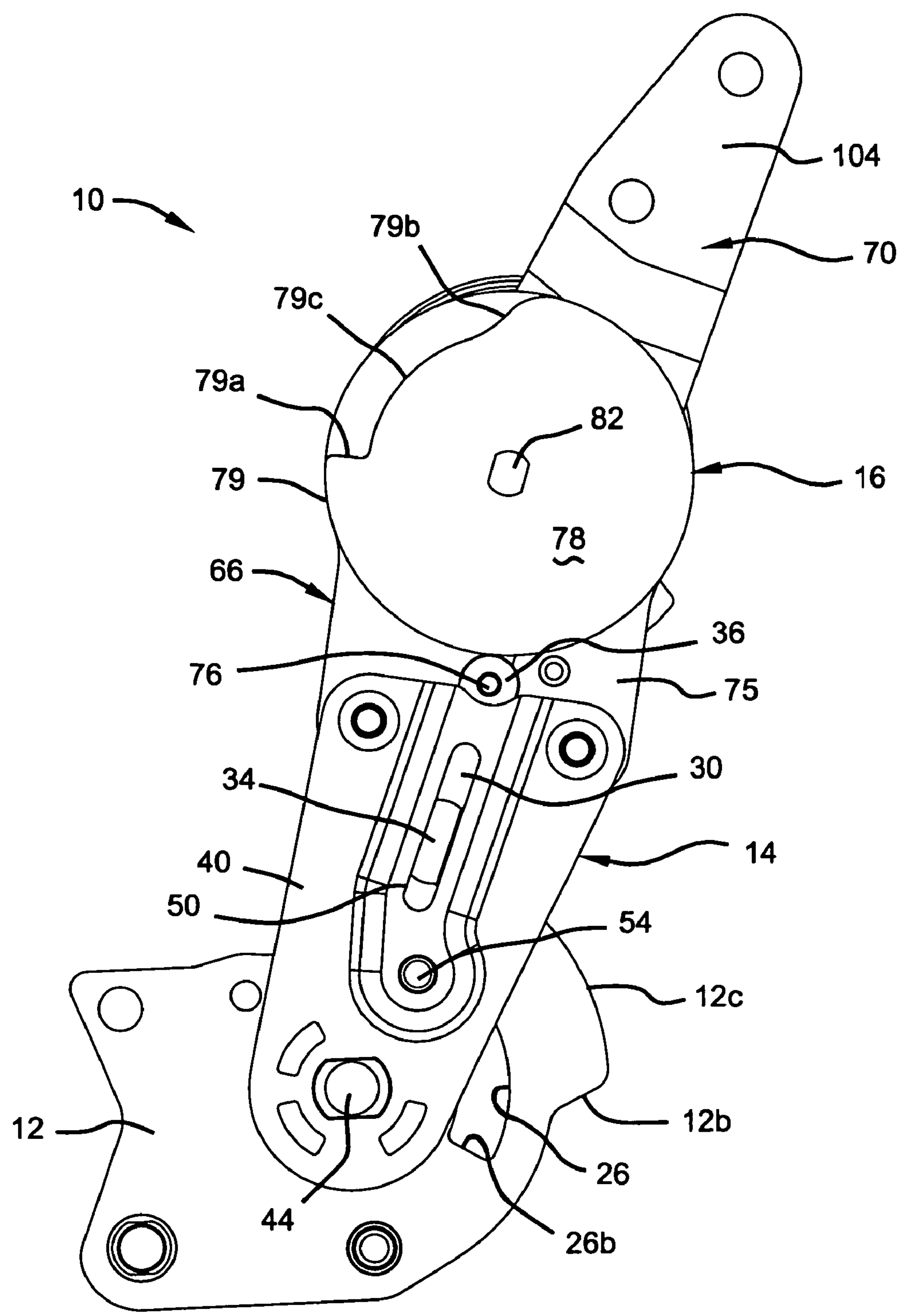
FIG. 1 is a side view of an exemplary vehicle seat recliner and folding latch assembly in accordance with the present invention.

The following description of the preferred embodiments is merely exemplary in nature and is in no way intended to limit the scope of the invention, its application, or its uses.

With reference to FIGS. 1–4, a vehicle seat recliner and folding latch assembly 10 in accordance with the present invention is described. The assembly 10 generally includes a lower quadrant disk 12, a slide pin sub-assembly 14 and a recliner mechanism 16. The slide pin sub-assembly 14 is supported on the lower quadrant disk 12 for pivotal displacement between a first position (shown in FIG. 5A) and a second position (shown in FIG. 5E). The recliner mechanism 16 is supported for rotational displacement on and relative to the slide pin sub-assembly 14 and is adapted to lock the slide-pin subassembly 14 in the first and second positions. The lower quadrant disk 12 includes a first thrust shoulder 12*a*, a second thrust shoulder 12*b* and a cammed surface 12*c*. The lower quadrant disk 12 further includes a pivot aperture 24 and an arcuate slot 26.

Figure 2:
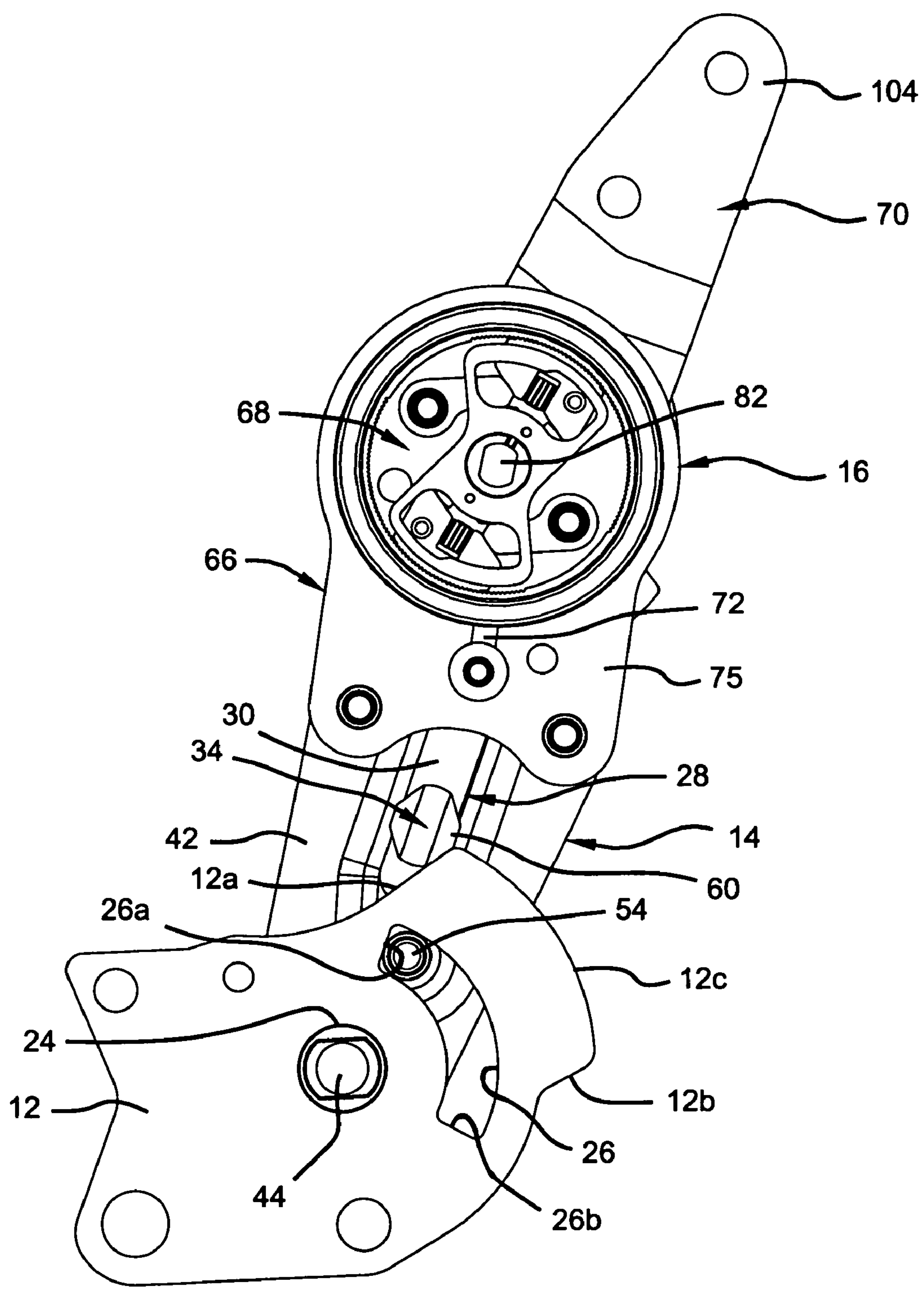
FIG. 2 is a side view of the vehicle seat recliner and folding latch assembly of FIG. 1 with the slide pin sub-assembly and actuation assembly exposed.

The slide pin sub-assembly 14 includes first and second housing plates 40, 42 and a lock assembly 28 (identified in FIG. 2). The first and second housing plates 40, 42 are pivotally supported on a pivot pin 44 disposed in the pivot aperture 24 of the lower quadrant disk 12. The first and second housing plates 40, 42 each include cooperating slide pin cavities 46, 48 and associated lock pin slots 50, 52, each identified in FIG. 3. A stop pin 54 extends between the housing plates 40, 42. The stop pin 54 is disposed in the arcuate slot 26 of the lower quadrant disk 12.

The lock assembly 28 includes first and second lock plates 30, 32, a lock pin 34, and first and second bearings 36, 38. The first and second lock plates 30, 32 include first and second lock pin apertures 56, 58. The lock pin 34 includes an octagonal mid region 60 and first and second wing regions 62, 64. The first and second wing regions 62, 64 engage the lock pin apertures 56, 58 of the first and second lock plates 30, 32, respectively. The lock assembly 28, including the lock pin 34 and first and second lock plates 30, 32, is disposed within the cooperating cavities 46, 48 of the housing plates 40, 42 such that the first and second wings 62, 64 further engage the first and second lock pin slots 50, 52. The cooperating cavities 46, 48 are generally larger than the lock plates 30, 32 to enable linear displacement of the lock assembly 28 therein. The first and second bearings 36, 38 are rotatably supported on a bearing pin 76 extending between the first and second lock plates 30, 32 at ends distal to the lower quadrant disk 12.

Figure 3:
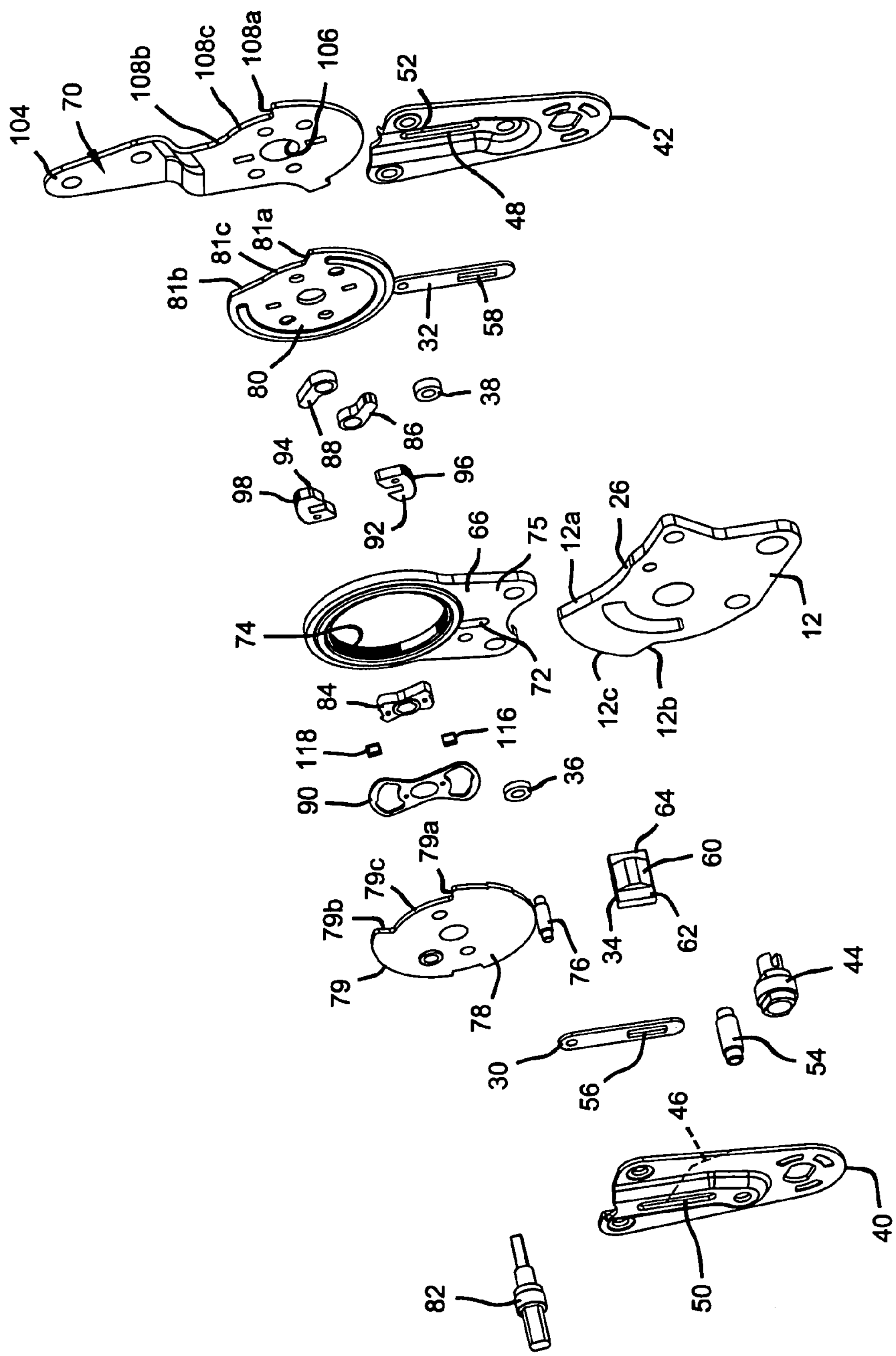
FIG. 3 is an exploded perspective view of the vehicle seat recliner and folding latch assembly of FIG. 1.
Figure 4:
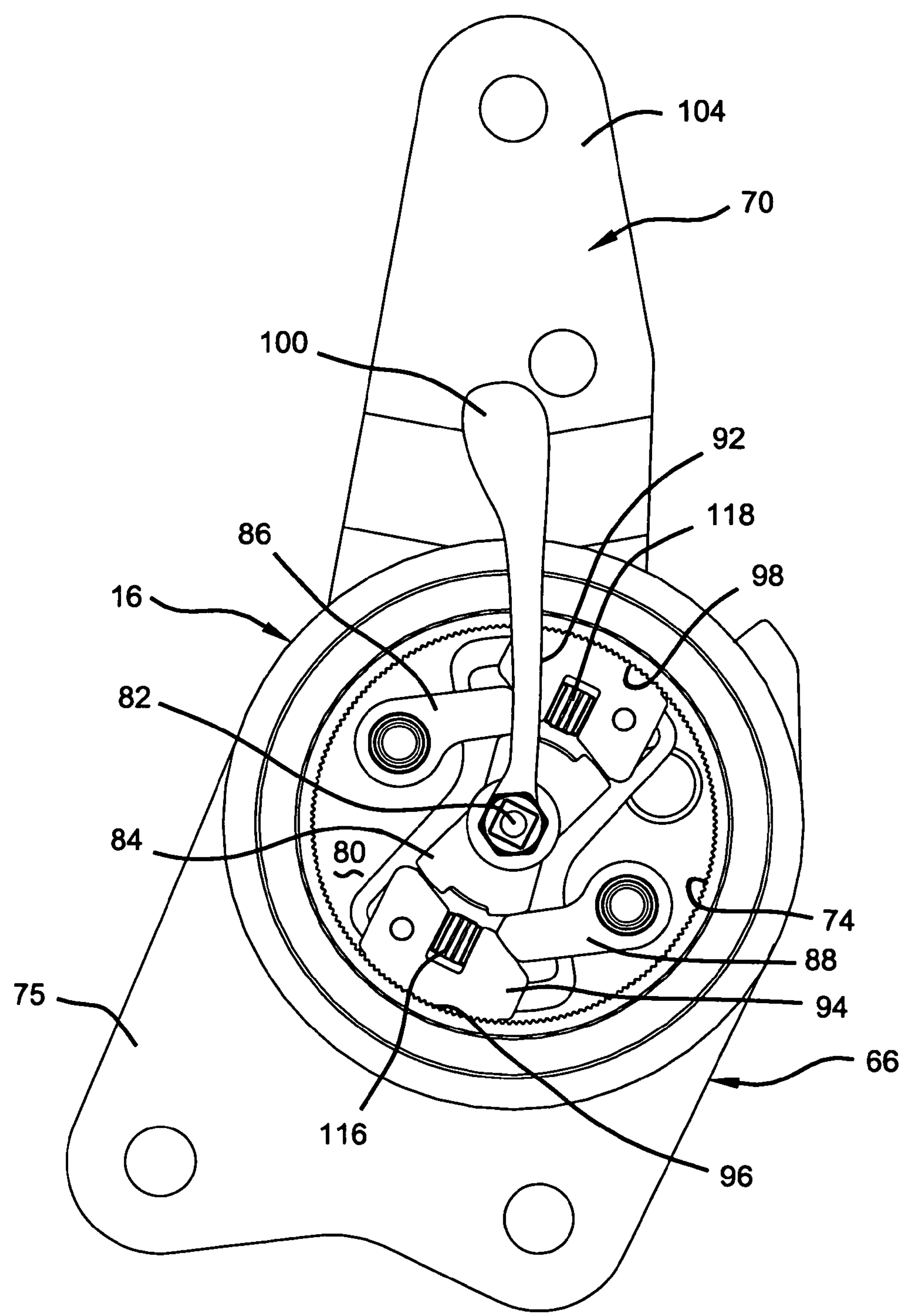
FIG. 4 is a detail view of the recliner mechanism of FIGS. 1–3 in an engaged position.

Referring specifically to FIGS. 3 and 4, the recliner mechanism 16 includes an upper quadrant disk 66, a recliner arm 70 and an actuation assembly 68. The upper quadrant disk 66 includes a bearing slot 72, a toothed aperture 74 and an attachment flange 75. The bearing slot 72 receives the bearing pin 76 of the lock assembly 28. The toothed aperture 74 receives the actuation assembly 68. The attachment flange 75 is attached to the slide-pin subassembly 14 with a pair of fasteners such as threaded fasteners. The recliner arm 70 includes a seat flange 104, an arm aperture 106 and an engagement edge 108. The recliner arm 70 is adapted to pivot relative to the upper quadrant disk 66. The engagement edge 108 includes a first locking shoulder 108*a,* a second locking shoulder 108*b* and a void edge 108*c.*

With reference to FIGS. 2–4, the actuation assembly 68 includes first and second housing disks 78, 80, a main pivot 82, a primary cam 84, first and second locking cams 86, 88, a release cam 90, first and second pawls 92, 94, and a lever 100 (shown in FIG. 4). The housing disks 78, 80, primary cam 84, and release cam 90 are all rotatably supported on the main pivot 82. Additionally, the housing disks 78, 80 include engagement edges 79, 81 in rolling engagement with the bearings 36, 38, respectively, of the lock assembly 28. The engagement edges 79, 81 each include first locking shoulders 79*a,* 81*a*, second locking shoulders 79*b,* 81*b* and void edges 79*c,* 81*c,* respectively, for actuating the slide-pin subassembly 14.

The first and second locking cams 86, 88 are also supported for rotational displacement on the second housing disk 80. The first and second pawls 92, 94 are supported for linear displacement on the second housing disk 80 and are engaged by the locking cams 86, 88, respectively. The first and second pawls 92, 94 further include toothed surfaces 96, 98 adapted to selectively engage the toothed aperture 74 of the upper quadrant disk 66. Furthermore, the pawls 92, 94 are biased out of engagement with the toothed aperture 74 of the upper quadrant disk 66 by biasing members 116, 118. The actuation assembly 68 is adapted to rotate relative to the upper quadrant disk 66 when the pawls 92, 94 are disengaged from the toothed aperture 74. The lever 100 is pivotally attached to the main pivot 82 and adapted to engage and/or disengage the actuation assembly 68.

Figure 5A:
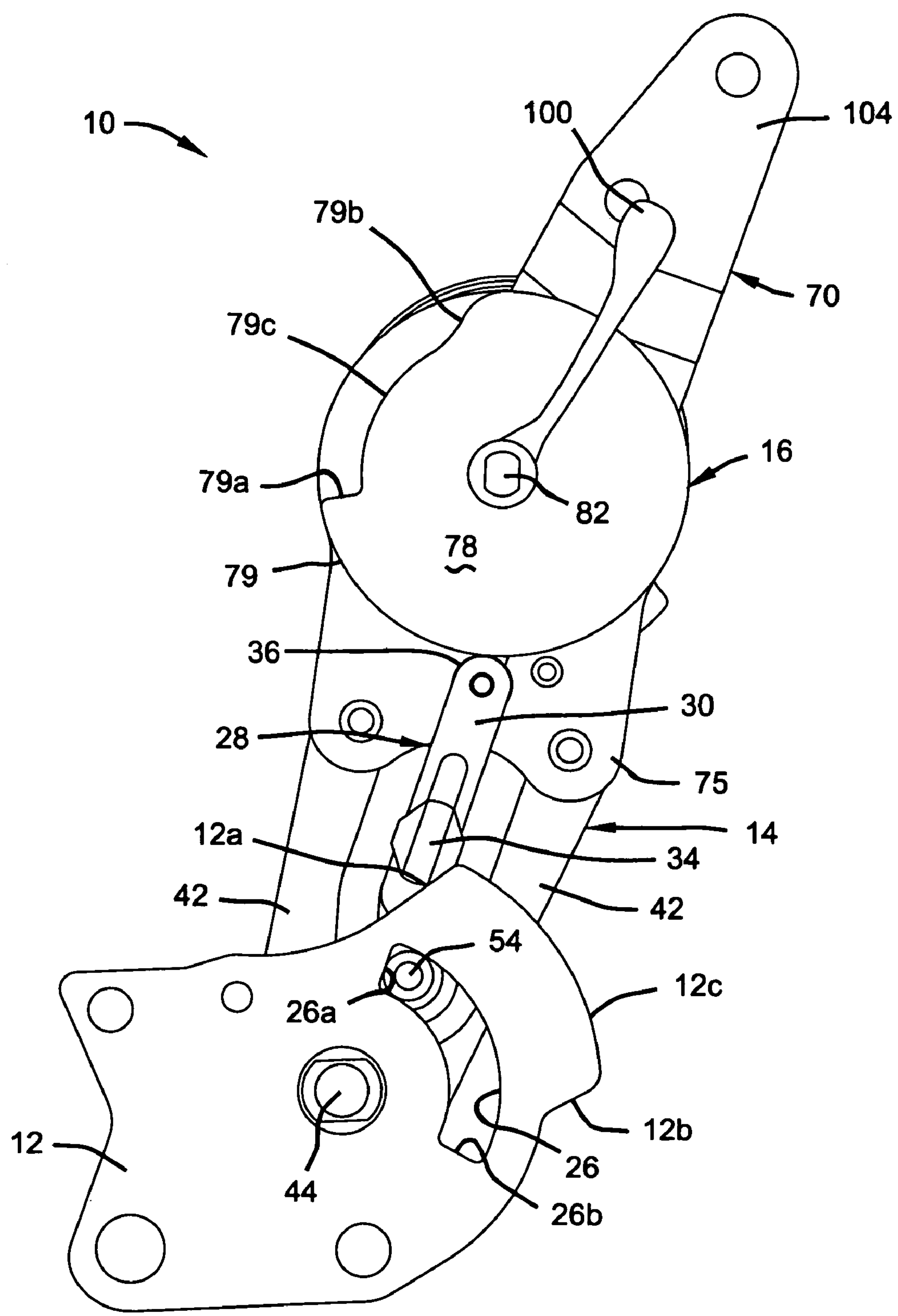
FIG. 5A is a side view of the vehicle seat recliner and folding latch assembly of the present invention, wherein the slide pin sub-assembly is locked in a first position.
Figure 5B:
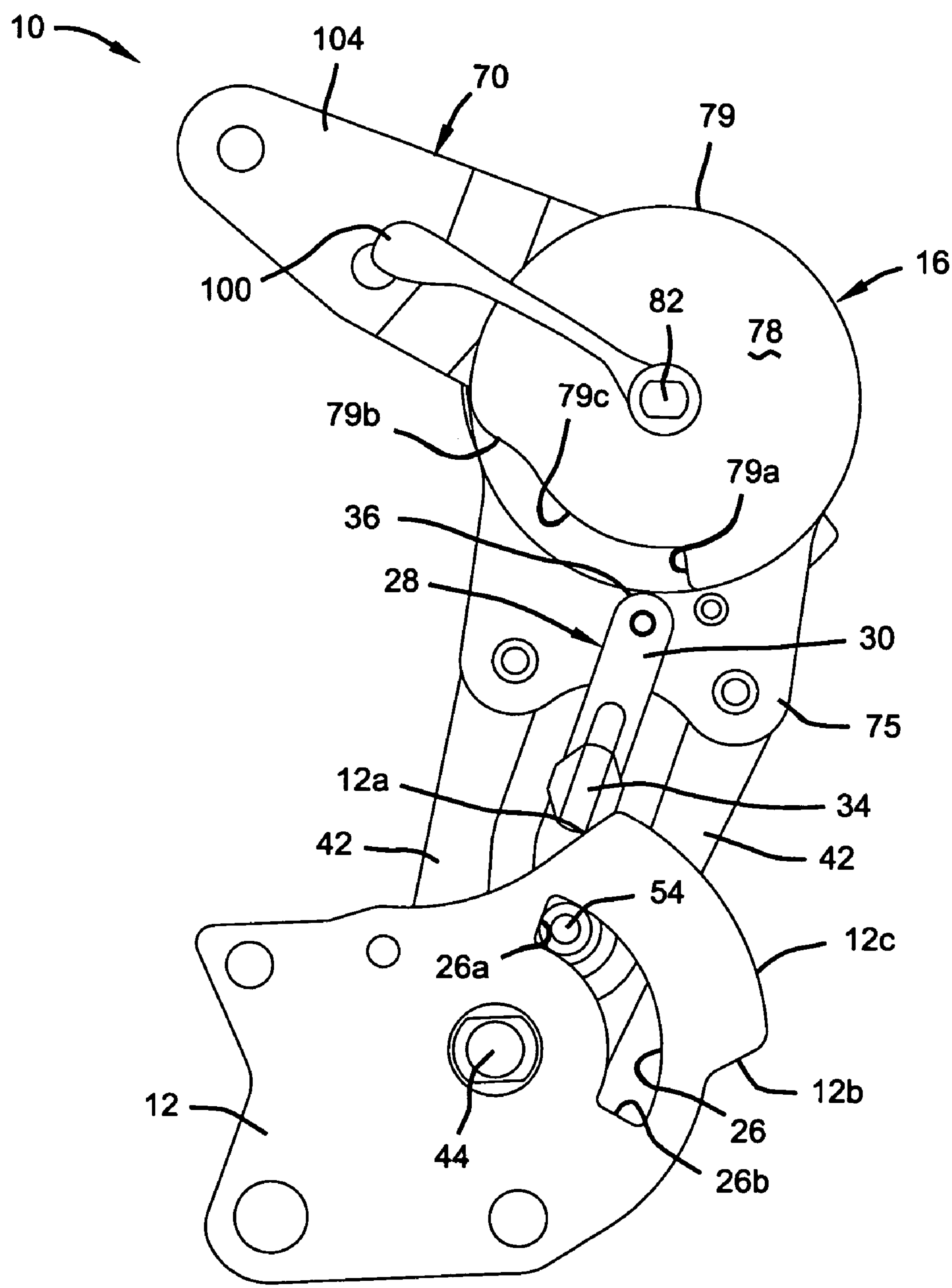
FIG. 5B is a side view of the vehicle seat recliner and folding latch assembly of the present invention, wherein the slide pin sub-assembly is unlocked in a first position.
Figure 5C:
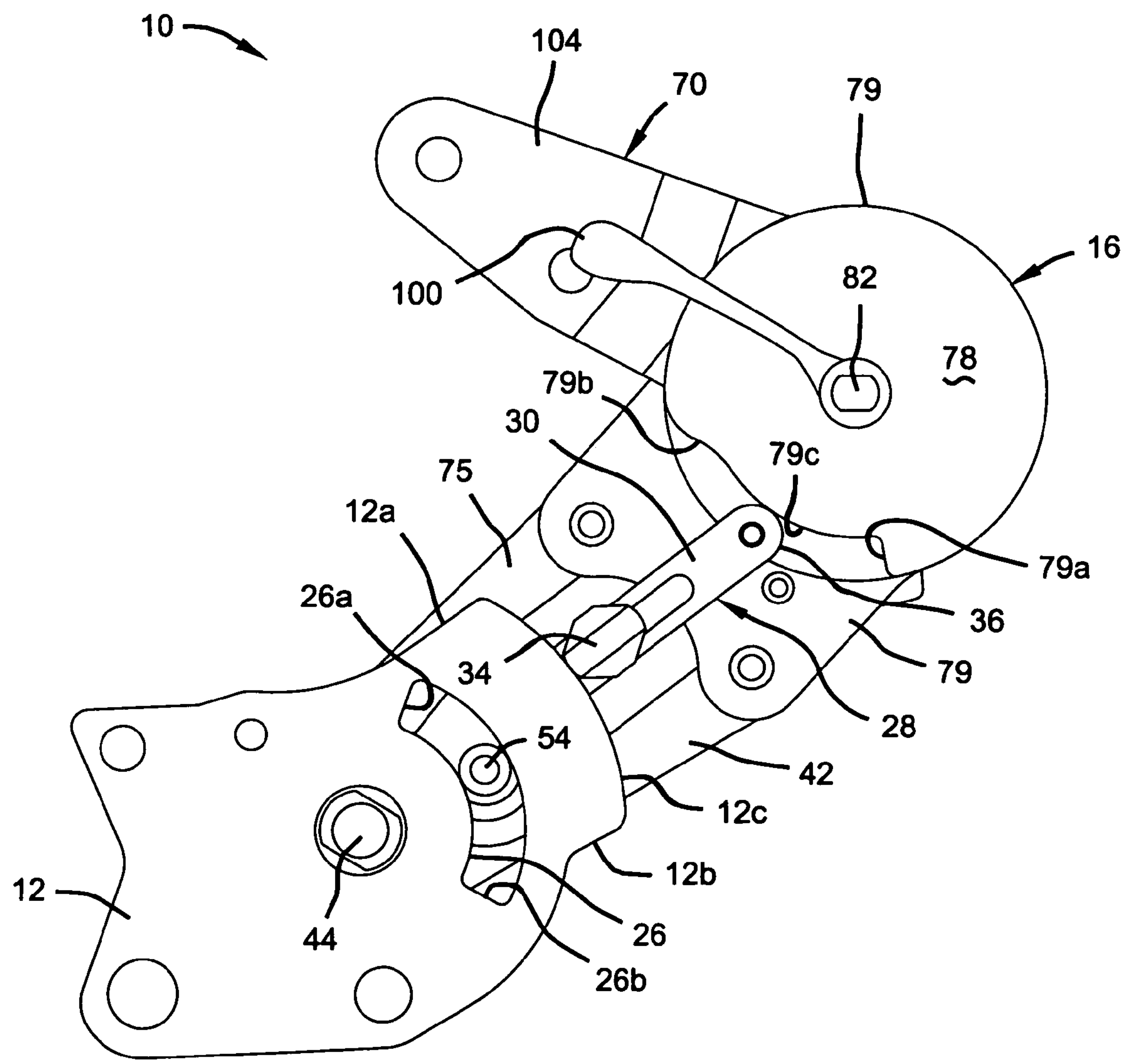
FIG. 5C is a side view of the vehicle seat recliner and folding latch assembly of the present invention, wherein the slide pin sub-assembly is in an intermediate position.
Figure 5D:
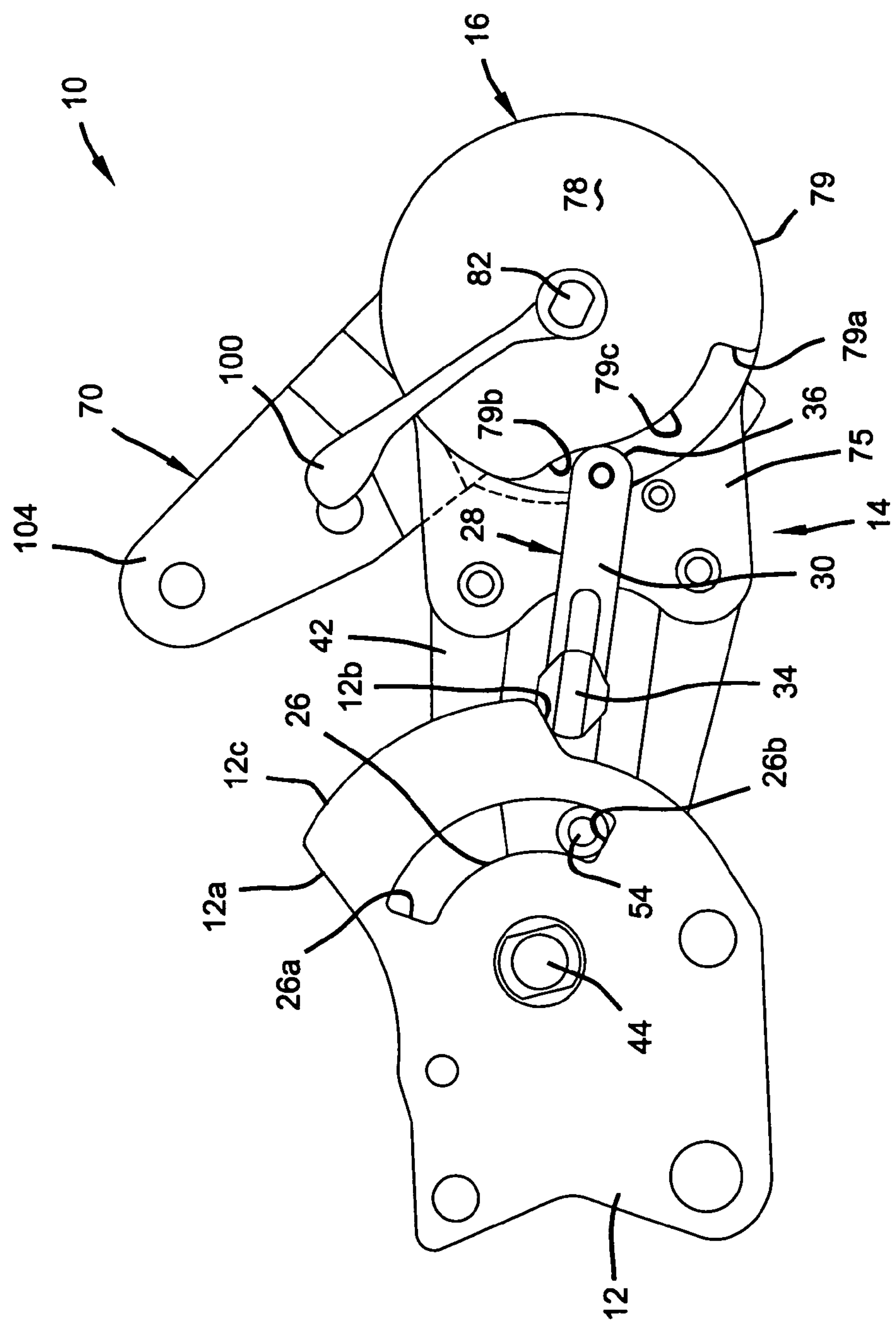
FIG. 5D is a side view of the vehicle seat recliner and folding latch assembly of the present invention, wherein the slide pin sub-assembly is in a second position.
Figure 5E:
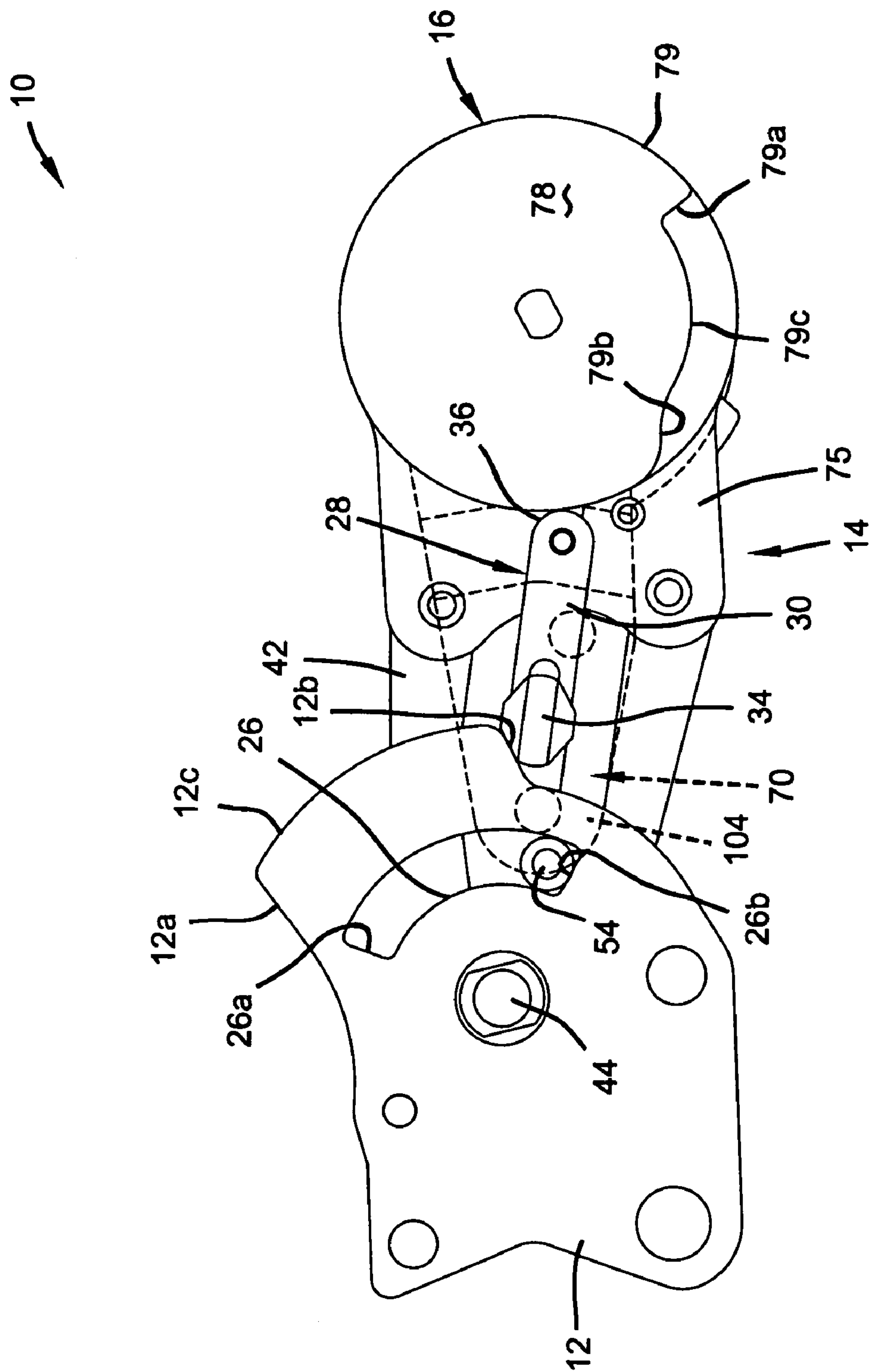
FIG. 5E is a side view of the vehicle seat recliner and folding latch assembly of the present invention, wherein the slide pin sub-assembly is locked in a second position.

With reference now to FIGS. 5A–5E, the operation of the vehicle seat recliner and folding latch assembly 10 of the present invention is described. FIG. 5A illustrates the vehicle seat recliner and folding latch assembly 10 in a first position. This first position is the operating or seating position of the assembly 10. As is illustrated, the lock pin 34 is engaged with the first thrust shoulder 12*a* on the lower quadrant disk 12. Additionally, the first bearing 36 of the slide pin sub-assembly 14 is engaged with the engagement edge 79 of the first housing plate 78. Furthermore, although not shown in FIG. 5, the second bearing 38 is engaged with the engagement edges 80, 108 of the second housing disk 80 and recliner arm 70. The recliner mechanism 16 blocks this feature in FIG. 5. Lastly, the stop pin 54 is in engagement with the first end 26*a* of the arcuate slot 26. In this position, the lock pin 34 prevents the slide pin sub-assembly 14 from pivoting in the clockwise direction and the stop pin 54 prevents the slide-pin subassembly 14 from pivoting in the counterclockwise direction.

The lever 100 is slightly pivoted in a clockwise direction to enable movement of the slide-pin subassembly 14 relative to the lower quadrant disk 12. The lever 100 displaces the primary cam 84 in the clockwise direction. The biasing members 116, 118 displace the pawls 92, 94 from the toothed aperture 74 of the upper quadrant disk 66 toward the main pivot 82. This disengages the actuation assembly 68 and enables rotation of the recliner mechanism 16, including the first and second housing disks 78, 80 and recliner arm 70, relative to the upper quadrant disk 66.

Referring to FIG. 5B, the housing plates 78, 80 and recliner arm 70 have been rotated such that the first locking shoulders 70*a,* 79*a,* 81*a* are aligned with the bearings 36, 38 on the slide pin sub-assembly 14. In this position, the lock pin 34 no longer prevents the slide pin sub-assembly 14 from pivoting in a clockwise direction. Hence, a slight moment applied to the slide pin sub-assembly 14 enables the first thrust shoulder 12*a* on the lower quadrant disk 12 to linearly displace the lock assembly 28 within the lock pin slots 50, 52 in the housing plates 40, 42, thereby enabling displacement of the assembly 10 toward the position shown in FIG. 5C.

FIG. 5C illustrates the vehicle seat recliner and folding latch assembly 10 in an intermediate position. The lock pin 34 has been disengaged from the first thrust surface 12*a* and now rests on the cammed surface 12*c* of the lower quadrant disk 12. Consequently, the first and second bearings 36, 38 rollingly engage the void edges 70*c,* 79*c,* 81*c* of the recliner arm 70 and housing disks 78, 80. A further moment applied to the slide pin sub-assembly 14 displaces the assembly 10 toward the position shown in FIG. 5D.

FIG. 5D illustrates the vehicle seat recliner and folding latch assembly 10, wherein the recliner arm 104 is in an intermediate position and the slide pin sub-assembly 14 is in a second position. The stop pin 54 is in engagement with the second end 26*b* of the arcuate slot 26 in the lower quadrant disk 12. This prevents the slide-pin subassembly 14 from pivoting further in the clockwise direction. Additionally, the lock pin 34 is aligned with the second thrust surface 12*b* of the lower quadrant disk 12. The first and second roller bearings 36, 38 maintain engagement with the void edges 70*c,* 79*c,* 81*c* of the recliner arm 70 and housing disks 78, 80. Further counterclockwise displacement of the recliner mechanism forces the second locking shoulders 70*b,* 79*b,* 81*b* of the recliner arm 70 and housing plates 78, 80 to displace the lock assembly 28 toward the position shown in FIG. 5E, wherein the slide-pin subassembly is locked in the second position.

To return the assembly 10 to the first position shown in FIG. 5A, the recliner mechanism 16 is actuated by the lever 100 and rotated in the clockwise direction. Rotational displacement of the recliner mechanism 16 enables the second thrust shoulder 12*b* to displace the lock assembly 28 within the lock pin slots 50, 52 in the housing plates 40, 42 in response to a moment applied to the slide-pin subassembly 14 in the counterclockwise direction. The bearings 36, 38 are consequently displaced to engage the void edges 70*c,* 79*c*, 81*c* of the recliner arm 70 and housing disks 78, 80. This unlocks the assembly 10 such that the lock pin 34 rests on the cammed surface 12*c* and the slide pin sub-assembly 14 is pivoted in the counterclockwise direction. Once the stop pin 54 engages the first edge 26*a* of the arcuate slot 26, the slide-pin subassembly 14 stops pivoting. The recliner mechanism 16 is then rotated in the clockwise direction until the first locking shoulders 70*a,* 79*a,* 81*a* displace the lock assembly 28 such that the lock pin 34 engages the first thrust shoulder 12*a* on the lower quadrant disk 12. This locks the slide pin sub-assembly 14 in the first position described above with reference to FIG. 5A.

Figure 6:
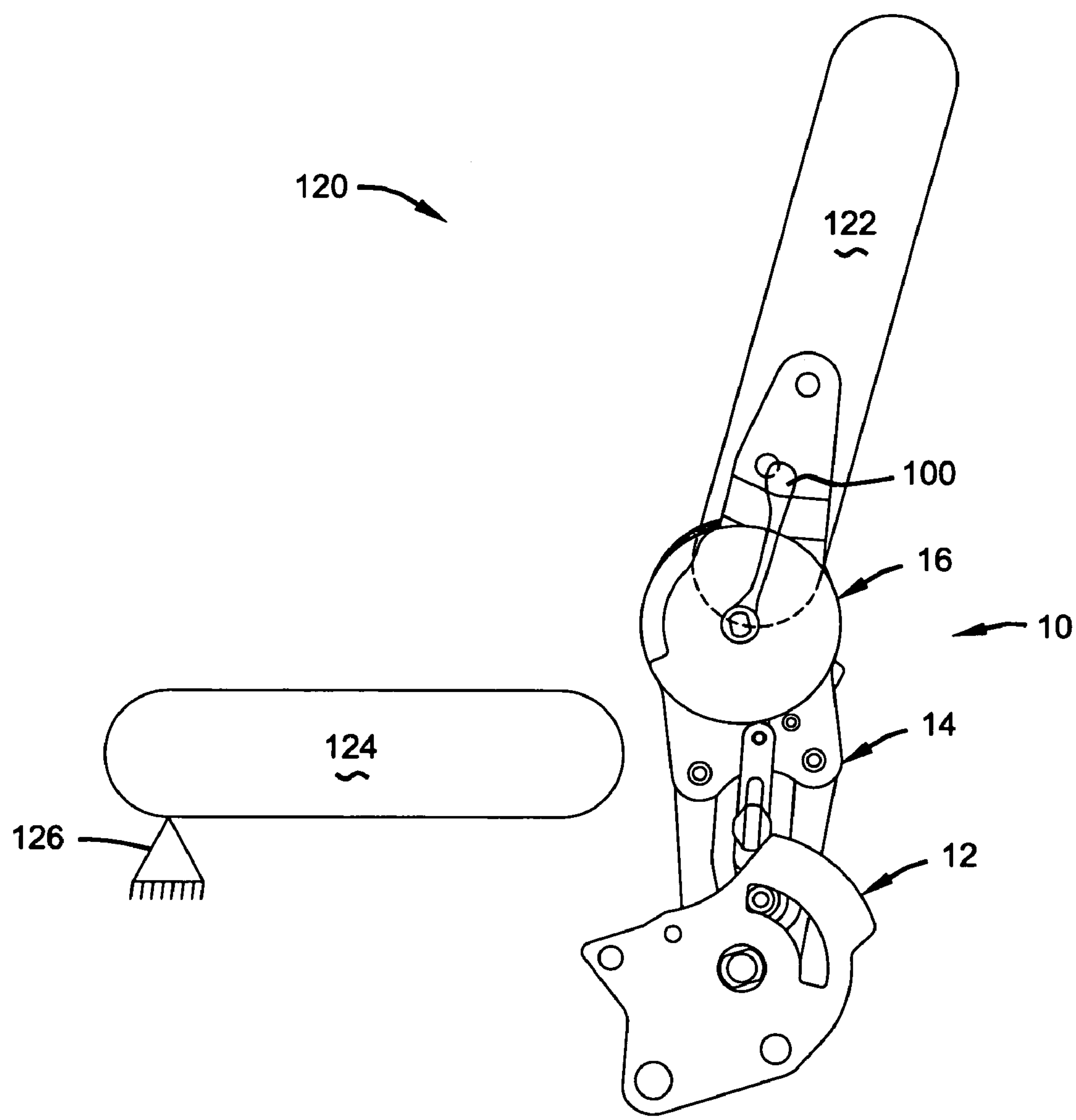
FIG. 6 is a side view of the vehicle seat assembly in accordance with the present invention with the recliner mechanism and slide pin sub-assembly exposed.
Figure 7:
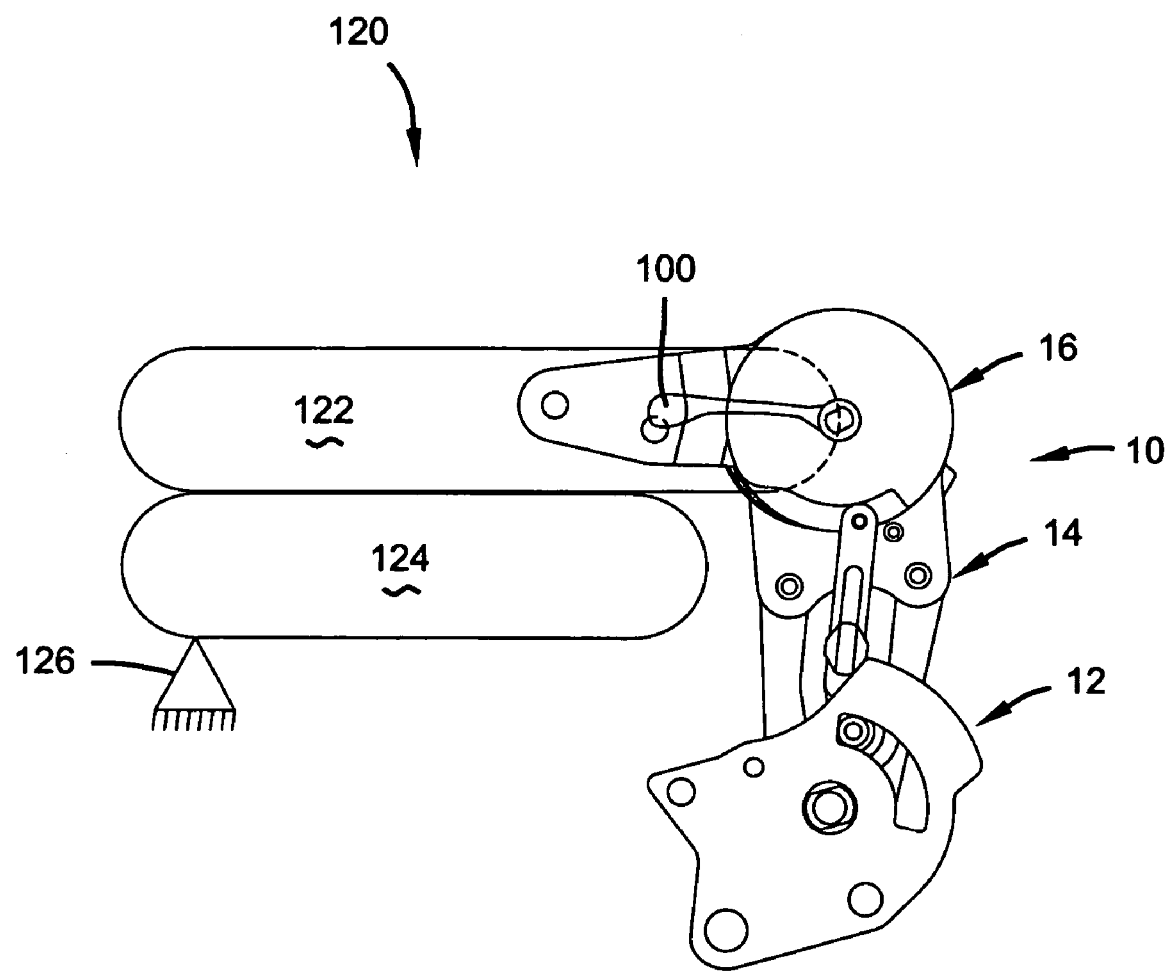
FIG. 7 is a side view of the vehicle seat assembly of FIG. 7 in a fold down position.
Figure 8:
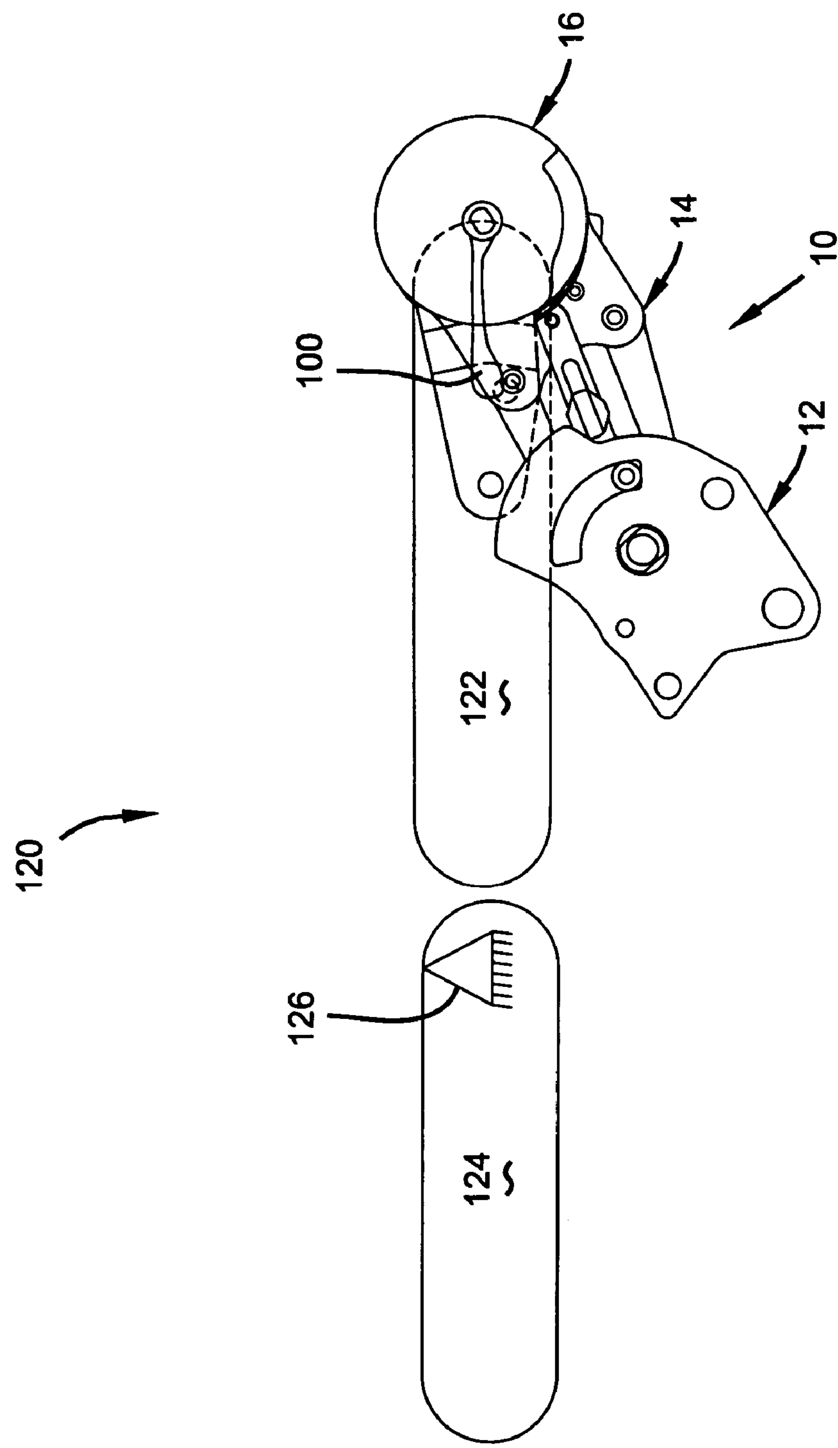
FIG. 8 is a side view of the vehicle seat assembly of FIG. 7 in a load floor position.

With reference now to FIGS. 6–8, a vehicle seat assembly 120 in accordance with the present invention is described. The vehicle seat assembly 120 generally includes a seat back 122, a seat bottom 124 and a vehicle seat recliner and folding latch assembly 10. The vehicle seat recliner and folding latch assembly 10 is identical to that described above. It includes a lower quadrant disk 12, a slide pin sub-assembly 14, and a recliner mechanism 16 and a lever 100. The seat back 122 is attached to the recliner mechanism 16 and adapted for pivotal displacement relative to the seat bottom 124. The seat bottom 124 is attached to a seat pivot 126.

Operation of the vehicle seat assembly 120 mirrors the operation of the vehicle seat recliner and folding latch assembly 10 described above. With reference to FIG. 7, the lever 100 has been pivoted to disengage the actuation assembly 68 of the recliner mechanism 16 and the seat back 122 has been pivoted into a fold down or table top position. In this position, the vehicle seat assembly 120 may be used as a work space for a passenger to the side or behind the vehicle seat assembly 120. It should be appreciated that the lever 100 is constantly aligned with the seat back 122 to provide for an unobstructed table top surface. This is due to the construction of the recliner mechanism 16, which is designed to rotate, as a whole, relative to the slide-pin subassembly 14.

With reference to FIG. 8, the seat bottom 124 has been pivoted 180° about the seat pivot 126 and the seat back 122, via the vehicle seat recliner and folding latch assembly 10, has been displaced into a second position. This configuration provides for a vehicle seat assembly 120 acting as a load floor. This is ideal for enabling a cargo area of a minivan or sport utility vehicle to be loaded with large items. It should be appreciated that the lever 100, as stated above, is constantly aligned with the seat back 122 to provide for an unobstructed load floor surface when the assembly 120 is in the second position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle seat recliner and folding latch assembly, comprising:

a lower quadrant disc;

a slide-pin subassembly supported on said lower quadrant disc for pivotal displacement between a first position and a second position, said slide-pin subassembly operable to be locked in said first and second positions; and a recliner arm including a main body portion and a seat flange generally extending from said main body portion, said main body portion supported by said slide-pin subassembly for pivotal displacement relative thereto, said seat flange having at least one mounting aperture therethrough, said mounting aperture adapted for non-rotatably coupling said seat flange to a seat back, wherein said recliner arm includes an engagement edge engaging said slide-pin subassembly and adapted to lock said slide-pin subassembly in said first and second positions.

2. The assembly of claim 1 wherein said slide-pin subassembly includes a housing plate supporting a lock-pin in an elongated slot, said lock pin displaceable within said slot between a locked position and an unlocked position.

3. The assembly of claim 2 wherein said lower quadrant disc includes a first thrust shoulder adapted to unlock said slide-pin subassembly from said first position and a second thrust shoulder adapted to unlock said slide-pin subassembly from said second position.

4. The assembly of claim 3 wherein said lower quadrant disc includes a cammed surface disposed between said first and second thrust shoulders for engaging said lock pin when said lock pin is in said unlocked position.

5. The assembly of claim 2 wherein said engagement edge of said recliner disc includes a first locking shoulder adapted to lock said slide-pin subassembly in said first position and a second locking shoulder adapted to lock said slide-pin subassembly in said second position.

6. The assembly of claim 5 wherein said engagement edge includes a void edge for receiving a portion of said slide-pin subassembly when said lock pin is in said unlocked position.

7. The assembly of claim 2 wherein said lock-pin is in constant engagement with said lower quadrant disc.

8. The assembly of claim 2 wherein said lock-pin has a generally octagonal cross-section.

9. The assembly of claim 1 wherein said slide-pin subassembly includes a roller bearing engaging said engagement edge of said recliner disc.

10. The assembly of claim 1 wherein said lower quadrant disc further includes an arcuate cavity receiving a stop pin attached to said slide-pin subassembly, said stop pin adapted to engage a first end of said cavity when said slide-pin subassembly is in said first position and a second end of said cavity when said slide-pin subassembly is in said second position.

11. A vehicle seat assembly, comprising;

a seat bottom;

a seat back; and a vehicle seat recliner and floor latch subassembly, including:

a lower quadrant disc;

a slide-pin subassembly supported on said lower quadrant disc for pivotal displacement between a first position and a second position, said slide-pin subassembly operable to be locked in said first and second positions; and a recliner arm non-rotatably attached to said seat back and supported by said slide-pin subassembly for pivotal displacement relative thereto, wherein said recliner arm includes an engagement edge engaging said slide-pin subassembly and adapted to lock said slide-pin subassembly in said first and second positions.

12. The assembly of claim 11 wherein said slide-pin subassembly includes a housing plate supporting a lock-pin in an elongated slot, said lock pin displaceable within said slot between a locked position and an unlocked position.

13. The assembly of claim 12 wherein said lower quadrant disc includes a first thrust shoulder adapted to unlock said slide-pin subassembly from said first position and a second thrust shoulder adapted to unlock said slide-pin subassembly from said second position.

14. The assembly of claim 13 wherein said lower quadrant disc includes a cammed surface disposed between said first and second thrust shoulders for engaging said lock pin when said lock pin is in said unlocked position.

15. The assembly of claim 12 wherein said engagement edge of said recliner arm includes a first locking shoulder adapted to lock said slide-pin subassembly in said first position and a second locking shoulder adapted to lock said slide-pin subassembly in said second position.

16. The assembly of claim 15 wherein said engagement edge includes a void edge for receiving a portion of said slide-pin subassembly when said lock pin is in said unlocked position.

17. The assembly of claim 12 wherein said lock-pin is in constant engagement with said lower quadrant disc.

18. The assembly of claim 12 wherein said lock-pin has a generally octagonal cross-section.

19. The assembly of claim 12 wherein said slide-pin subassembly includes a roller bearing engaging said engagement edge of said recliner arm.

20. The assembly of claim 11 wherein said lower quadrant disc further includes an arcuate cavity receiving a stop pin attached to said slide-pin subassembly, said stop pin adapted to engage a first end of said cavity when said slide-pin subassembly is in said first position and a second end of said cavity when said slide-pin subassembly is in said second position.

21. The assembly of claim 11 further comprising a seat pivot supporting a front side of said seat bottom for approximately 180° pivotal displacement.

22. The assembly of claim 11 wherein said seat bottom includes a bottom surface and a top surface, said top surface adapted to be exposed in a seating position and said bottom surface adapted to be exposed in a load floor position.

* * * * *